US009211623B2

(12) United States Patent
Suzuki et al.

(10) Patent No.: US 9,211,623 B2
(45) Date of Patent: Dec. 15, 2015

(54) SAFETY DEVICE FOR A ROTATIONAL FEED AXIS

(75) Inventors: Toshihiro Suzuki, Aiko-gun (JP); Shinji Terakawa, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 14/118,736

(22) PCT Filed: May 20, 2011

(86) PCT No.: PCT/JP2011/062145
§ 371 (c)(1),
(2), (4) Date: Nov. 19, 2013

(87) PCT Pub. No.: WO2012/160706
PCT Pub. Date: Nov. 29, 2012

(65) Prior Publication Data
US 2014/0090517 A1    Apr. 3, 2014

(51) Int. Cl.
*B23Q 16/00* (2006.01)
*B23Q 1/25* (2006.01)
(Continued)

(52) U.S. Cl.
CPC ............ *B23Q 16/02* (2013.01); *B23Q 11/0085* (2013.01); *B23Q 11/0092* (2013.01); *B23Q 16/06* (2013.01); *B60T 1/005* (2013.01); *F16D 63/006* (2013.01); *B23Q 2220/004* (2013.01); *Y10T 74/1406* (2015.01)

(58) Field of Classification Search
CPC .. B23Q 16/06; B23Q 16/02; B23Q 2220/004; B23Q 11/0092; B23Q 11/0085

USPC ................ 74/813 L, 813 R, 814, 816; 279/5; 82/121; 409/197, 198; 269/53, 55, 59, 269/60, 63, 71; 29/281.1
See application file for complete search history.

(56) References Cited

U.S. PATENT DOCUMENTS

| 3,735,470 A | 5/1973 | Elmer et al. |
| 3,760,652 A * | 9/1973 | Joyard et al. .................... 74/527 |

(Continued)

FOREIGN PATENT DOCUMENTS

| DE | 3143983 A1 * | 6/1982 |
| JP | 51-90195 | 1/1975 |

(Continued)

OTHER PUBLICATIONS

Machine translation of DE 3143983 A1 obtained on Sep. 25, 2014.*

(Continued)

*Primary Examiner* — Adam D Rogers
(74) *Attorney, Agent, or Firm* — Morrison & Foerster LLP (57) ABSTRACT

The present invention provides a safety device for a rotating feed rod, the safety device preventing the accidental rotation of the rotating feed rod and being provided with: a rotating member which is provided in any rotating shaft of a power transmission mechanism of the rotating feed rod and in which a plurality of openings are formed in the circumferential direction thereof; and at least two plunger pins which are disposed apart from each other in the circumferential direction of the rotating member in a housing of the rotating feed rod and provided to be movable forward and backward so as to be accepted in the openings of the rotating member. Even when the rotating shaft is indexed at an arbitrarily defined rotational position, at least one plunger pin among the plunger pins is accepted in the opening.

2 Claims, 7 Drawing Sheets

(51) Int. Cl.
  B23Q 16/02 (2006.01)
  B23Q 16/06 (2006.01)
  B23Q 11/00 (2006.01)
  B60T 1/00 (2006.01)
  F16D 63/00 (2006.01)

(56) References Cited

U.S. PATENT DOCUMENTS 4,690,252 A * 9/1987 Kottke et al. .................. 188/69
4,991,474 A * 2/1991 Thumm et al. ................ 82/159
5,918,510 A * 7/1999 Uemura et al. ............. 74/813 L

FOREIGN PATENT DOCUMENTS

| | | |
|---|---|---|
| JP | 9-188232 | 7/1997 |
| JP | 2918732 | 7/1999 |
| JP | 2001-341051 | 12/2001 |
| WO | WO-2008/029486 | 3/2008 |

OTHER PUBLICATIONS

International Search Report dated Aug. 9, 2011, directed to International Application No. PCT/JP2011/062145; 2 pages.

* cited by examiner

SAFETY DEVICE FOR A ROTATIONAL FEED AXIS

REFERENCE TO RELATED APPLICATIONS

This application is the national stage application under 35 USC 371 of International Application No. PCT/JP2011/062145, filed May 20, 2011, the entire contents of which are incorporated herein by reference.

FIELD OF THE INVENTION

The invention relates to a machine tool, in particular a safety device for a rotational feed axis for preventing abnormal rotation of the rotational feed axis of a machine tool.

BACKGROUND OF THE INVENTION

Recently, in the field of machine tools, it is desired to increase efficiency. As a way to increase efficiency, it is possible to increase the outputs of the driving motors for driving the feed axes and the spindle in order to increase the machining speed and to reduce the machining time. However, for this purpose, the strength of the constitutional members of a machine tool must be increased which result in an increase in size of the machine tool and reduction in tool life.

Further, in order to increase the efficiency of a machine tool, it is necessary to reduce the time period for changing processed and unprocessed workpieces. In order to change processed and unprocessed workpieces, an operator often needs to directly access machine tools, in particular compact machine tools. In such a case, the safety of the operator must be ensured.

Furthermore, in the field of machine tools, machining processes are becoming complex, whereby machine tools having four or more feed axes including one or more rotational feed axes as well as orthogonal three linear feed axes are becoming widespread. In machine tools having four or more feed axes, a workpiece is mounted directly to a rotary table or to a workpiece mount such as a rotary workhead or an angled mount secured to a rotary table. Therefore, when an operator carries out a preparation, removing a processed workpiece from and attaching a new unprocessed workpiece to the workpiece mount, if the rotational table unintentionally rotates, the preparation is obstructed and the safety of the operator is deteriorated. Thus, safety devices for securing rotational tables so as to prohibit the rotation thereof have been developed.

1 Japanese Patent No. 2918732
2 WO 2008/029486

SUMMARY OF THE INVENTION

Document 1 discloses a clamping device for fixing a rotational feed axis at any rotational position. The clamping device of Document 1 is provided with clamping means which is disposed on an inner surface of a table base and has a clamp shoe defining a thin portion to face a table. Pressurized oil is supplied to the clamping means from an oil source, which is provided in a machining area, to the clamping means to press the thin portion against the table whereby the table is fixed.

Document 2 discloses a workpiece setting station provided with a sub-pallet mount having a downwardly extending shaft portion which defines circumferentially disposed four indexing holes into one of which an indexing pin is laterally inserted. The indexing pin is linked to a pedal disposed beneath the base whereby the indexing pin is disengaged from one of the indexing hole when the pedal is stepped by an operator so that the sub-pallet mount can be rotated manually.

The clamping device of Document 1 is complex because it is necessary to provide it with a clamping shoe, and therefore is not suitable to be applied to a compact machine tool.

In the workpiece setting station of Document 2, the indexing pin cannot be inserted into the indexing holes depending on the rotational position of the sub-pallet mount, therefore the pallet mount cannot be fixed at an arbitrary rotational position.

The present invention is directed to solve the problems of the prior art, and the object of the present inventions is to provide a safety device for a rotational feed axis of a machine tool for locking the rotational feed axis for any rotational position to prevent unintentional rotation of the rotational feed axis.

According to the present invention, there is provided a safety device of a rotational feed axis for preventing abnormal rotation of the rotational feed axis, including a rotational member provided on a rotational shaft of a power transmission mechanism for the rotational feed axis, the rotational member defining a plurality of openings disposed away from each other in the circumferential direction of the rotational member, and at least two pins, disposed away from each other in the circumferential direction of the rotational member in a housing for the rotational feed axis, the at least two pins being extendable and retractable so as to be receive in the openings of the rotational member wherein at least one of the pins can be received in the openings for any rotational position of the rotational shaft.

According to the present invention, at least one of the pins are received into the openings of the rotational member for any rotational position of the rotational shaft of the rotational feeding axis whereby the rotational shaft can be prevented from rotation at any rotational position.

DETAILED DESCRIPTION OF THE INVENTION

Figure 1:
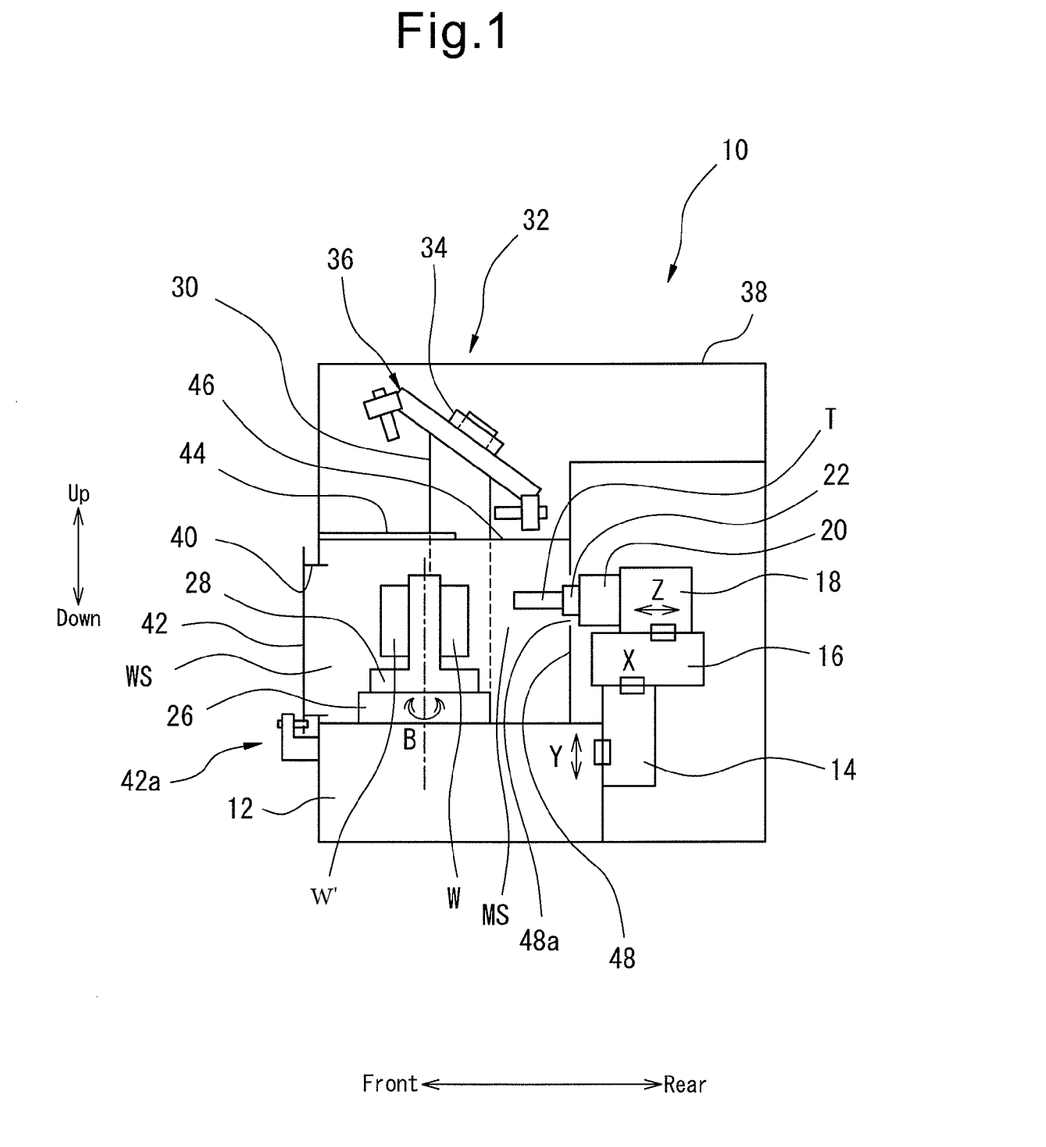
FIG. 1 is a schematic side view of a machining center provided with a safety device for the rotational feed axis according to a first embodiment of the present invention.

With reference to FIGS. 1-5, an embodiment of a machining center according to the present invention will be described below. FIG. 1 is a side view showing a schematic configuration of a machining center according to the present invention. The up-down direction and the font-rear direction are defined as illustrated, and the configuration will be described accordingly. Further, the left-right direction is defined perpendicular to the plane of the drawing so that the directions toward and away from the plane are respectively the left and the right sides.

With reference to FIG. 1, machining center 10 is shown as a machine tool comprising a safety device for a rotational feed axis according to a first embodiment of the present invention. Machining center 10 comprises a bed 12 adapted to be secured to the floor of a factory, a vertically movable body 14 mounted to a rear side of the bed 12 by a linear feed mechanism for linear movement in the vertical direction (Y-axis direction), a left-right movable body 16 mounted to the top of the vertically movable body 14 by a linear feed mechanism for linear movement in left-right direction (X-axis direction), and a front-rear movable body 18 mounted to the top of the left-right movable body 16 by a linear feed mechanism for linear movement in the front-rear direction (Z-axis direction). A spindle head 20, for supporting a spindle 22 for rotation about a rotational axis extending in the front-rear direction, is mounted to the front portion of the front-rear movable body 18. A tool T is attached to the end of the spindle 22.

Each of the linear feed mechanisms for the vertical, left-right and front-rear directions may be composed of, for example, a guiding device including a guide rail and a guide block, and a driving device including a ball screw and a servomotor for rotationally driving the ball screw. The tool T is rotationally driven along with the spindle 22 by a spindle motor disposed with in the spindle head 20.

A rotary table 26, forming the rotationally feeding axis to which the present invention is applied, is mounted to the top of the bed 12 for rotation about a vertical axis (B-axis). An angled mount 28, defining double workpiece mounting faces, is mounted to the top of the rotary table 26. Workpieces W and W' are mounted to the workpiece mounting faces. The configuration allows the tool T to be moved relative to the workpiece W in orthogonal three-axis directions (X, Y and X-axis directions) and one rotational-axis direction (B-axis) whereby the workpiece is machined into a desired shape.

A pair of pillars 30 are disposed respectively on the left and right sides of the bed 12. A tool changer 32 is mounted to the top ends of the pillars 30. The tool changer 32 includes a magazine base 34 extending between the top ends of the pillars 30 and tool magazine 36 rotatably supported on the magazine base 34. The magazine base 34 is inclined so that its front side is higher than its rear side, and accordingly the tool magazine 36 is inclined.

The whole machining center 10 is enclosed by a substantially rectangular cover 38. Provided in the front side of the cover 38 is an opening 40 which is opened and closed by an access door 42. The access door 42 has a door lock 42a for preventing the access door 42 from opening.

A horizontal partition 44 and a shutter 46, which is retractable in the horizontal direction, are disposed above the bed 12 with in the cover 32, whereby the inside volume of the cover is divided into a space for accommodating the magazine 32 above the partition 44 and shutter 46 and another space for accommodating the workpiece W beneath the partition 44 and the shutter 46. When tools are changed, the shutter 46 opens to allow the tool change. When tool change is completed, the shutter 46 is closed to prevent the chips and machining fluid generated during process from flying toward the tool magazine 36.

The space beneath the partition 44 and the shutter 46 where the workpiece W is placed is further divided into a workpiece setting station WS toward the access door 42 from the center of the B-axis and a machining space MS away from the center of the B-axis.

Further, a spindle head cover 48 is provide in front of the movable bodies 14, 16 and 18. The spindle head cover 48 defines an opening 48a through which the spindle 22 and tool T extend into the machining space MS. The spindled head cover 48 is telescopic in both the vertical and left-right directions, and therefore, the opening 48a moves vertical and left-right directions with the vertical and left-right movements of the spindle head 20.

Figure 2:
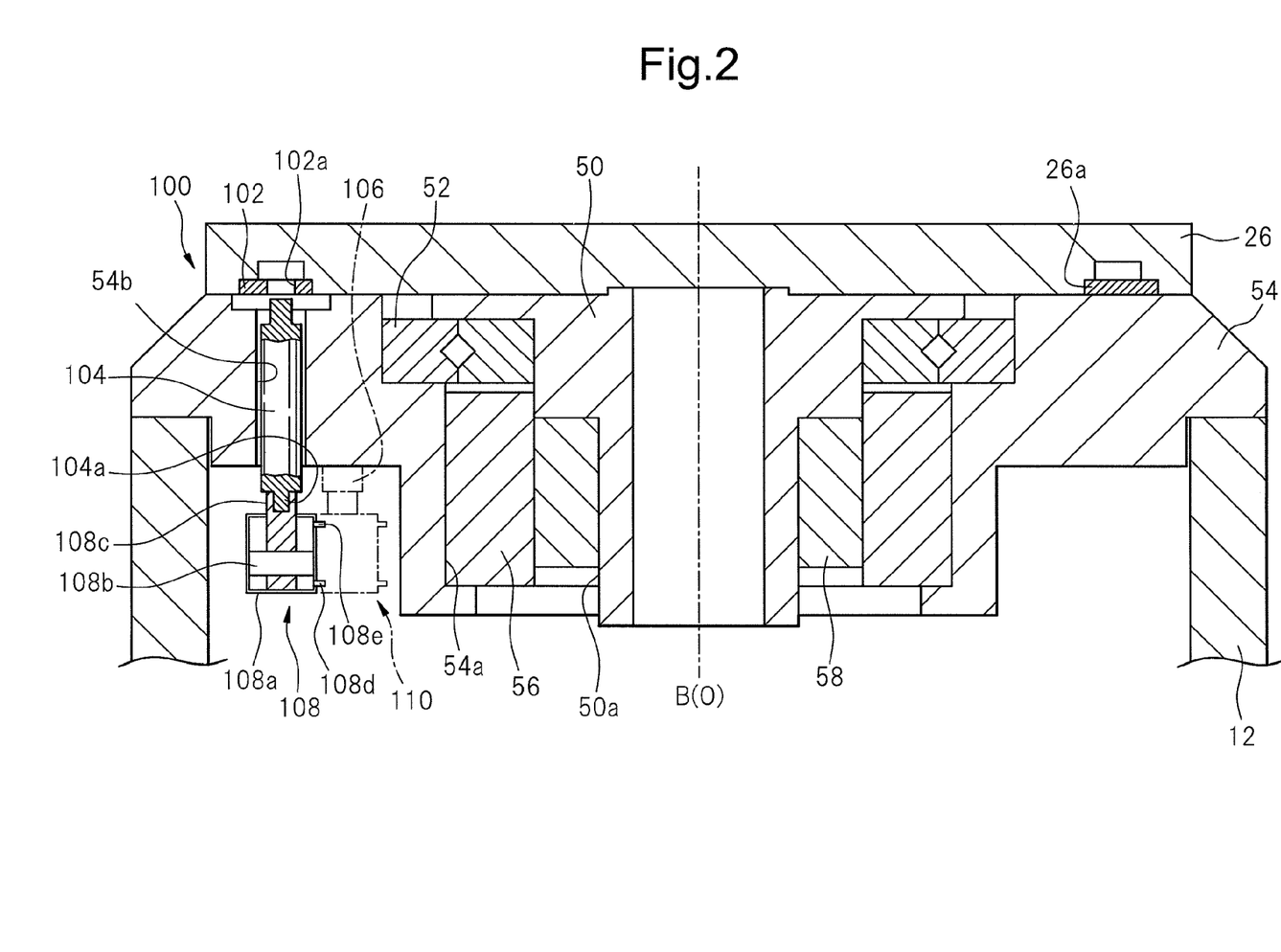
FIG. 2 is a cross-sectional view of a B-axis rotational table of the machining center of FIG. 1 with the safety device according to the first embodiment.

With reference to FIG. 2, the rotary table 26 is secured to a shaft 50 which is supported by a housing 54 through a bearing preferably a cross-roller bearing 52 for rotation about the B-axis. The housing 54 is secured to the top of the bed 12. A stator 56 is secured to the inner surface 54a of the housing 54 and a rotor 58 is secured to the outer surface 50a of the shaft 50 whereby the stator 56 and the rotor 58 form a B-axis feeding motor.

A safety device 100 for a rotational feed axis according to a first embodiment shown in FIG. 2 comprises annular member 102 secured to the bottom surface of the rotary table 26, first and second pins 104 and 106 mounted to the housing 54, and first and second actuators 108 and 110 coupled to the lower ends 104a (the lower end of the second pin 106 is not shown) of the first and second pins 104 and 106. Thus, the two pins 104 and 106 extend and retract in the longitudinal direction of the rotational shaft 50. The rotary table 26 defines an annular recess 26a for receiving the annular member 102. The housing 54 defines openings 54b (only opening 54b for the first pin 104 is shown in FIG. 2) for receiving the first and second pins 104 and 106. The openings extend parallel to the B-axis or in the direction of B-axis. In the present embodiment, the rotary table 26, shaft 50 and the annular member 102 form a rotary member provided on a rotating shaft of a power transmission mechanism around the rotationally feeding shaft of the B-axis.

The first and second actuators 108 and 110 are similar to each other, and therefore only the first actuator 108 will be described below. In this embodiment, the first actuator 108 is a fluid cylinder, in particular a pneumatic cylinder, including a cylinder 108a, a piston 108b slideable in the cylinder 108a, a piston rod 108c attached to the piston 108b and outwardly extending from the cylinder 108a and first and second ports 108d and 108e respectively for introducing into and exhausting from the cylinder 108a a pressurized air as a working fluid. A position sensor (not shown) is attached to the actuator 108 in order to sense the position of the piston rod 108c i.e., the position of the pin 104.

Figure 3:
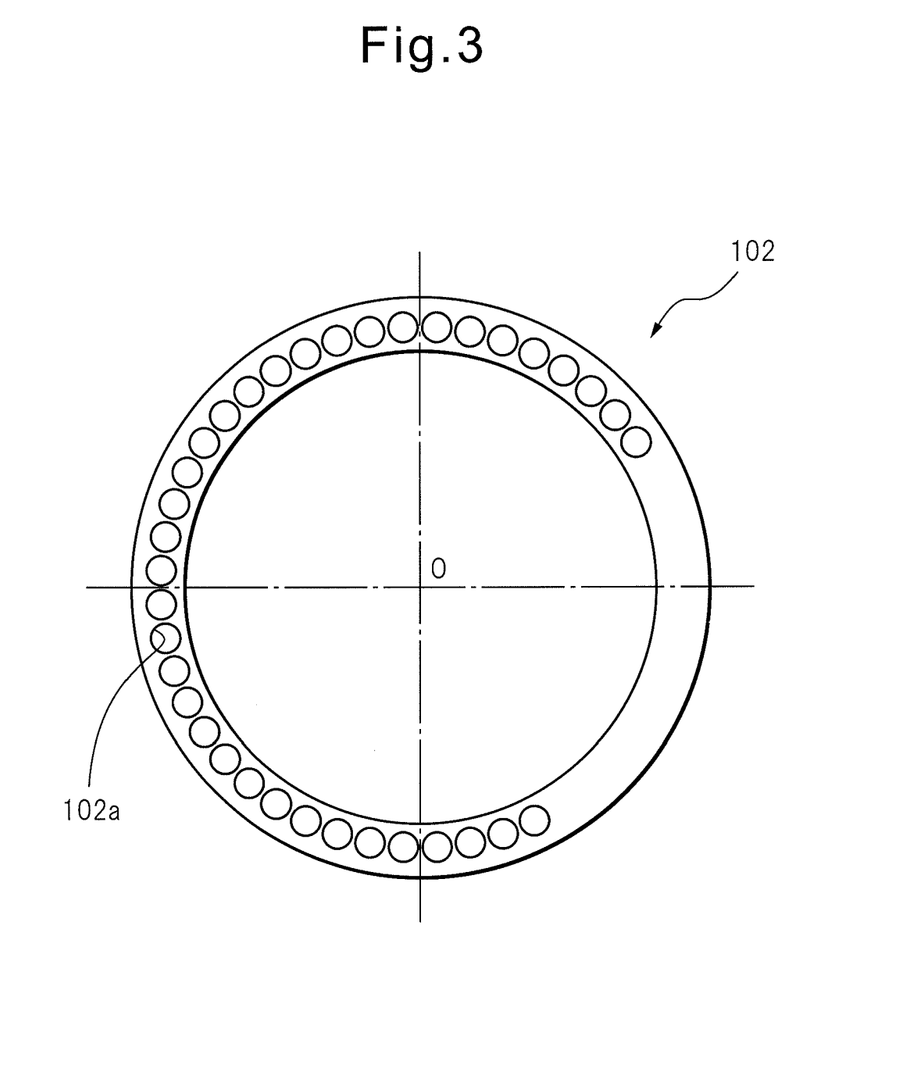
FIG. 3 is a plan view of an annular member of the safety device of FIG. 2.
Figure 4:
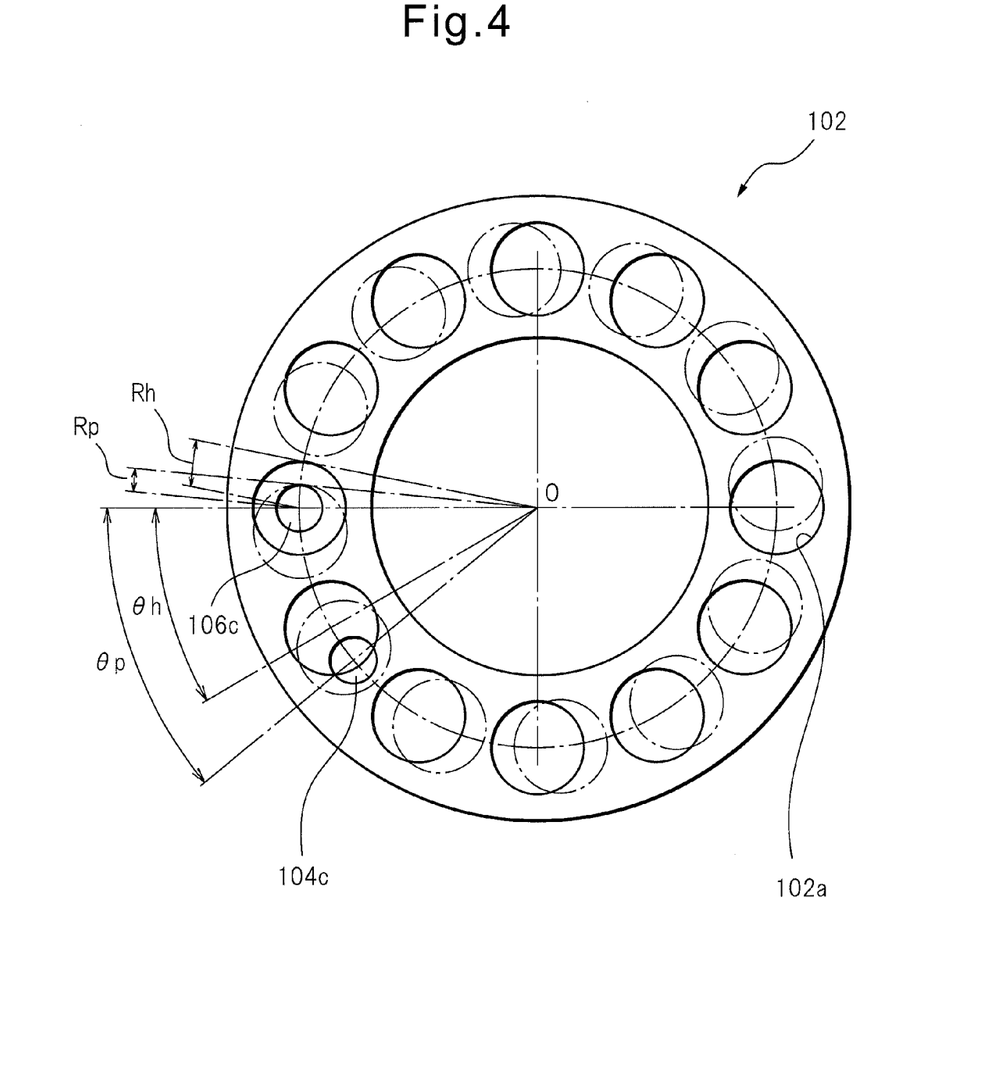
FIG. 4 is a schematic diagram for explaining the principles of the present invention.

With reference to FIG. 3, the annular member 102 defines a plurality of opening which can receive the end portions 104c and 106c of the first and second pins 104 and 106 (refer to FIG. 4). The plurality of openings 102a are equally disposed in the circumferential direction of the annular member 102 within a range covering the working range of the rotation of the rotary table 26. Further, if it is preferable that the rotary table 26 rotates over 360 degrees around the B-axis, the annular member 102 may have the openings 102a provided over its whole circumference, as shown in FIG. 4. The openings 102a may be provided by U-shaped cutouts other than circular holes.

Figure 4A:
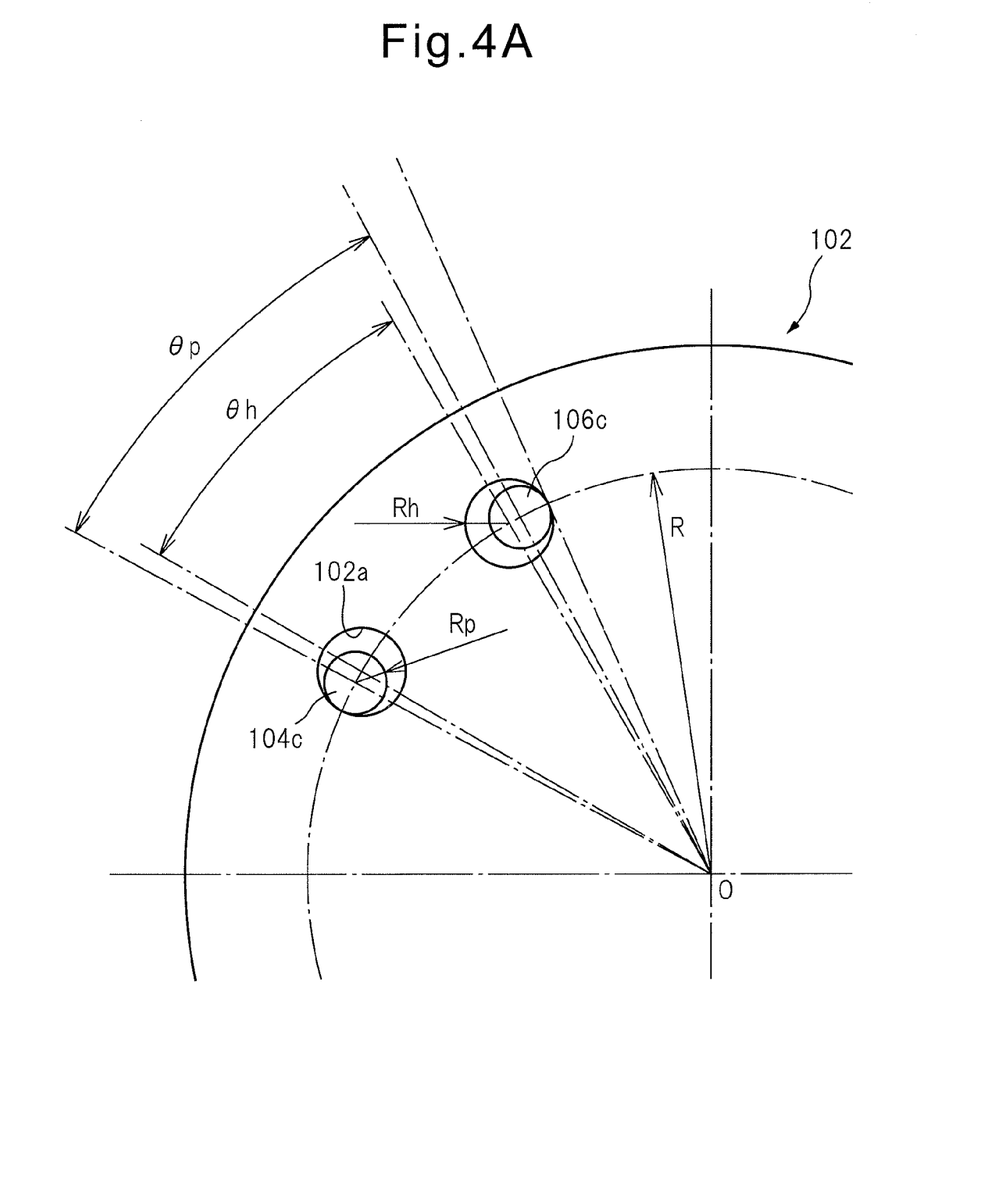
FIG. 4A is a schematic diagram for explaining the principles of the present invention.
Figure 4B:
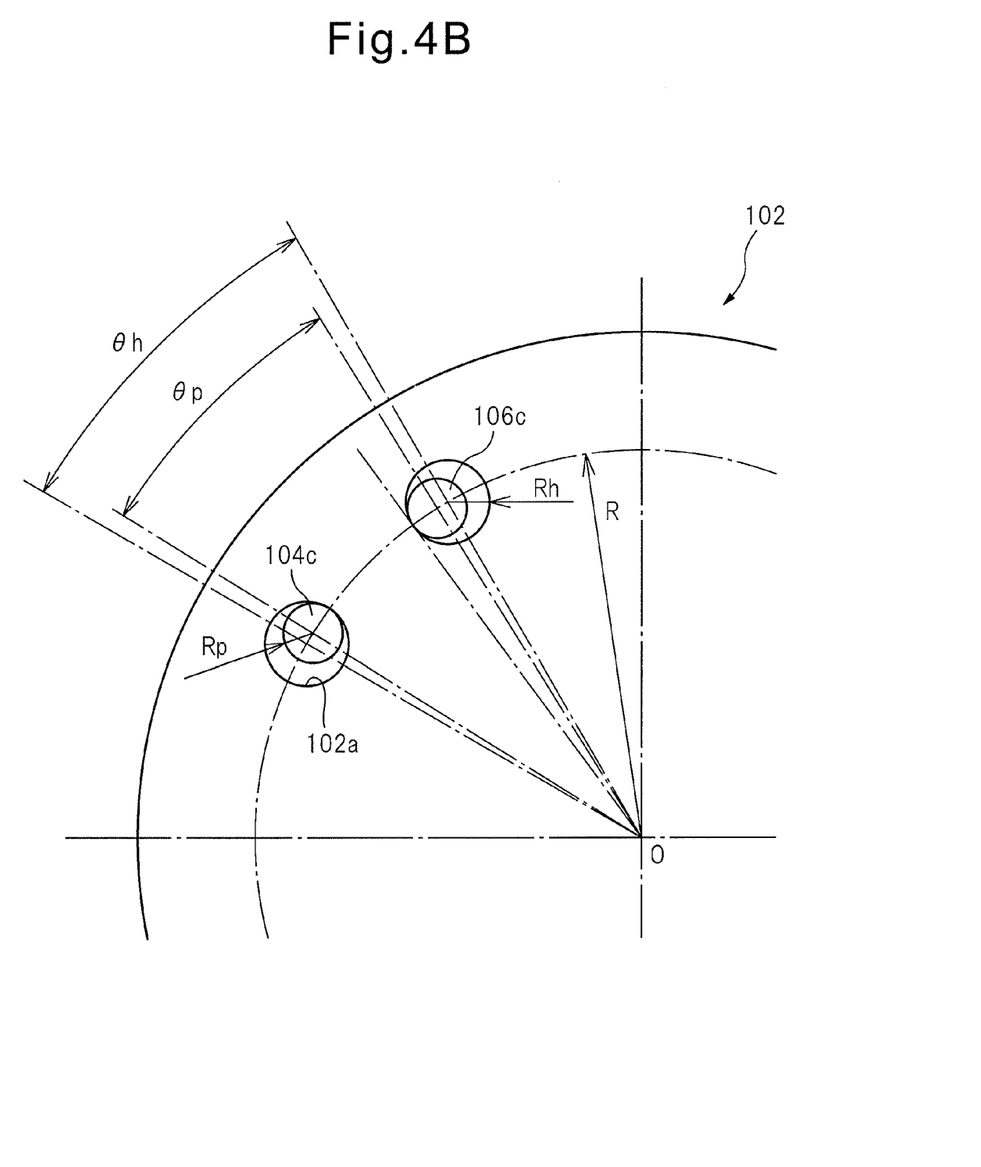
FIG. 4B is a schematic diagram for explaining the principles of the present invention.

With reference to FIGS. 4, 4A and 4B, the principle of the present invention will described, below. In this connection, it should be noted that FIG. 4 is a schematic illustration for explaining the principle of the present invention, and therefore the scales of the annular member 102 and the openings 102a do not exactly coincide with the actual scales and the number of the openings 102a is also different from the actual number.

The present invention is characterized by the configuration for allowing one or both of the pins 104 and 106 to engage with the openings 102a of the annular members 102 for any rotational position of the rotary table 26 about the B-axis. For this purpose, the following inequality must be satisfied, on the assumption that the centers of the pins 104 and 106 are aligned with the pitch circle of the openings 102a.

$$\theta p < \theta h + 2((\sin^{-1}(Rh/R) - (\sin^{-1}(Rp/R))) \quad (1)$$

$$\theta h - 2((\sin^{-1}(Rh/R) - (\sin^{-1}(Rp/R))) < \theta p \quad (2)$$

where

R: the radius of the pitch circle on which the openings 102a are disposed in the annular member Rh: the radius of the openings 102a

Rp: the radius of the end portions of the first and second pins 104 and 106

θh: the angle formed by the lines extending between the center O of the annular member 102 and the centers of two openings 102a being next to each other θp: the angle formed by the lines extending between the center O of the annular member 102 and the centers of the first and second pins 104 and 106

The inequality (1) expresses the configuration shown in FIG. 4A, in which the angle formed by the outermost two tangential lines, extending from the center O of the annular member 102 to the respective side walls of the first and second pins 104 and 106, is smaller than the angle formed by the outermost two tangential lines, extending from the center O of the annular member 102 to the respective side walls of the two openings 102a adjacent to each other.

The inequality (2) expresses the configuration shown in FIG. 4B, in which the angle formed by the innermost two tangential lines, extending from the center O of the annular member 102 to the respective side walls of the first and second pins 104 and 106, is larger than the angle formed by the innermost two tangential lines, extending from the center O of the annular member 102 to the respective side walls of the two openings 102a adjacent to each other.

Inequalities (1) and (2) provide a more general expression, as shown below.

$$n\theta h - 2((\sin^{-1}(Rh/R) - (\sin^{-1}(Rp/R))) < \theta p < n\theta h + 2((\sin^{-1}(Rh/R) - (\sin^{-1}(Rp/R))) \quad (3)$$

where, n is an integer equal to or more than 1.

The functional operation of the present embodiment will be described below.

In standard machining processes, when the machining of the workpiece W in the machining space MS is completed, the rotary table 26 rotates 180 degrees about the B-axis to change the processed workpiece W with unprocessed workpiece W'. The rotation puts the processed workpiece W at the workpiece setting station WS and the unprocessed workpiece W' in the machining space MS to face to the tool T, during which the rotary table 26 is held at a desired rotational position by the torque generated by the feeding motor 56 and 58. Then, an operator opens the access door 42 to detach the processed workpiece W from the angled mount 28 and attach a new unprocessed workpiece to the angled mount 28. Then, when the operator closes the access door 42, machining condition is prepared to start machining the workpiece W according to a machining program. During the machining process, the door lock 42a prevents the access door 42 from being opened.

According to the present embodiment, the operator can access the workpiece setting station WS safely, even when a machining process is running, by sending for example an interrupt command or a preparation command based on M code when the movement about the B-axis is stopped during the execution of the machining program. The interrupt command or the preparation command activates both the first and second actuators. As in the present embodiment, if the first and second actuators are the pneumatic cylinders 108 and 110, compressed air is supplied to the first ports 108d. This moves the pins 104 and 104 to upwardly extend from the housing 54. As described above, both or one of the end portions 104c and 106c of the first and second pins 104 and 106 enter the openings 102a of the annular member 102 to prevent the rotary table 26 from unintentionally rotating. Then, the door lock 42a is unlocked to allow the access door 42 to be opened, when the position sensors for the pins 104 and 106 detects both or one of the pins 104 and 106 extend sufficiently from the housing 54.

In this connection, if a condition in which one of the pins 104 and 106 does not extend sufficiently from the housing 54 is detected, the air circuit is switched so that compressed air is supplied to the second port 108e so as to retract the one of the pins. This is for the purpose of preventing the actuator of one of the pins from applying pressure upwardly to the annular member 102 whereby the displacement of the rotary table 26 due to the biasing force. If only one of the pins 104 and 106 is inserted into the opening 102a of the annular member 102, the rotary table 26 may be unintentionally rotationally displaced by difference between the diameters of the opening 102a and the end portion 104c or 106c of the pin 104 or 106. However, the difference in the diameters is very small in view of safety, and therefore the rotational displacement is admissive in the present invention.

When a workpiece is machined in the machining space MS, the access door 42 is opened to carry out workpiece removing and attaching operation in the workpiece setting station WS. Then, after the access door 42 is closed, when the door lock 42 is engaged, by sending an interrupt signal or a preparation complete signal by using an M code, a machining process including B-axis motion can be carried out. Accordingly, the safety device 100 allows an operator to carry out the preparation safely when a workpiece is machined. The workpiece W can be machined when an operator removes the processed workpiece from the angled mount 28 and attaches an unprocessed workpiece to the angled mount 28, whereby the processing time can be reduced.

Figure 5:
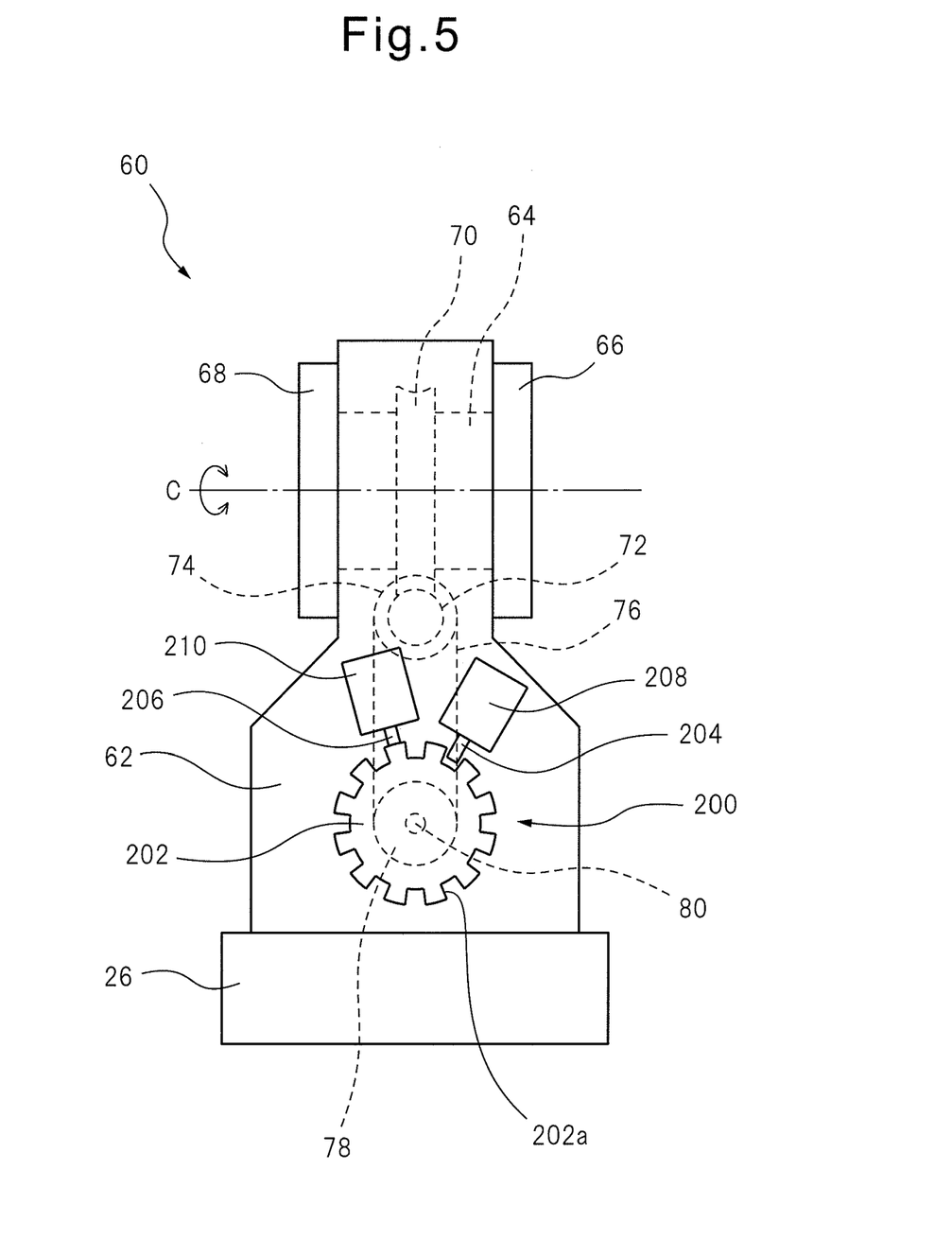
FIG. 5 is a side view of a rotary workhead with a safety device according to a second embodiment.

With reference to FIG. 5, a second embodiment of the present invention will be described below.

In FIG. 5, a rotary workhead 60 is a rotatable table and comprises a body 62 secured to the rotary table 26. The body 62 provides a housing within which a shaft 62 is supported by the upper portion of the body 62 for rotation about an axis (C-axis) parallel to the Z-axis. Workpiece mounting plates 66 and 68 are secured to the either ends of the shaft 62, forming the C-axis. The rotary workhead 60 further comprises a worm wheel 70 secured to the shaft 64, a worm gear 72 engaging the worm wheel 70, a pulley 74 secured to the worm gear 72 so as to rotate with the worm gear 72, a belt 76 engaging with the pulley 74 and a drive pulley 78 secured to a output shaft 80 of a C-axis driving motor (not shown) to engaging with the belt 76 at a side opposite to the pulley 72.

A safety device 200 according to the second embodiment comprises a rotational member 202 secured to the output shaft 80 of the C-axis driving motor so as to rotate with the output shaft 80. The rotational member 202 formed as a rotary plate defines a plurality of openings 202a which radially outwardly open. The safety device 200 further comprises first and second pins which extend radially relative to the output shaft 80 and are engageable with the openings 202a, and first and second actuators 208 and 210, secured within the body 62, for extending and retracting the first and second pins. The first and second actuators 208 and 210 may be formed, as in the first embodiment, by fluid cylinders, in particular pneumatic cylinders.

The first and second pins 204 and 206 and the openings 202a are positioned, as in the first embodiment, so that one or both of the pins 204 and 206 can engage with the openings 202a for any rotational position of the rotational member 202.

According to this embodiment, given that the reduction ratio between the worm wheel 70 and the worm gear 72 is, for example, 1/60, the amount of rotation of the workpiece mounting plates 66 and 68 is 1/60 of the amount of rotation of the rotational member 202. Therefore, the openings 202a may be coarsely defined in the rotational member 202. Further, even if only one of the pins 204 and 206 is inserted into the opening 202a of the rotational member 202, the control for retracting the pin, which is not received, is not required, because the workpiece mounting plates 66 and 68 are not directly applied with a pressure.

When the configuration for driving the rotary table 26, which forms the B-axis, of the first embodiment is replaced with the configuration of the second embodiment including the worm wheel and the worm gear, the safety device can be provided with the pins disposed in the radial direction of the rotational member of the second embodiment. Further, the safety device for the rotary workhead 60, forming the C-axis of the second embodiment, can be formed by an annular member, similar to that of the first embodiment, which is placed at the inner side of one of the workpiece mounting plates 66 and 68 to face the body 62, and pins, instead of the rotational member 202 and the pins 204 and 206.

As described above, the safety device for a rotational feed axis of the present invention has a simple configuration, comprising a rotational member defining a plurality of openings and at least two pins, and can prevent abnormal rotation of rotary feed axis by engaging at least one of the pins with one of the openings for any rotational position of the rotational member.

The invention claimed is:

1. A safety device of a rotational feed axis of a machine tool for preventing unintentional rotation of the rotational feed axis, comprising:
   a rotary table provided on a rotational shaft of a power transmission mechanism for the rotational feed axis and configured to mount a workpiece thereon;
   an annular member concentrically attached to the rotary table;
   a plurality of openings defined in the annular member to open in a direction of a rotational feed axis of the rotary table, and disposed at equal intervals in a circumferential direction of the annular member; and
   at least two pins, disposed away from each other in the circumferential direction of the annular member in a housing for the rotational feed axis, the at least two pins being extendable and retractable so as to be received in the openings of the annular member;
   wherein the at least two pins are disposed so that an angle formed by two lines extending between the center of the annular member and corresponding centers of two adjacent openings and an angle formed by two lines extending between the center of the annular member and corresponding centers of two adjacent pins do not coincide with each other, whereby at least one of the pins can be received in the openings for any rotational position of the rotational shaft when the at least two pins are extended simultaneously.

2. The safety device of claim 1, wherein the at least two pins are configured to extend and retract in a longitudinal direction of the rotational shaft.

* * * * *